(12) United States Patent
Shionuma (10) Patent No.: US 11,780,159 B2
(45) Date of Patent: Oct. 10, 2023

(54) ADDITIVE MANUFACTURING DEVICE AND ADDITIVE MANUFACTURING METHOD

(71) Applicant: IHI CORPORATION, Tokyo (JP)

(72) Inventor: Kenta Shionuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 413 days.

(21) Appl. No.: 16/757,641

(22) PCT Filed: Oct. 30, 2018

(86) PCT No.: PCT/JP2018/040360
§ 371 (c)(1),
(2) Date: Apr. 20, 2020

(87) PCT Pub. No.: WO2019/088114
PCT Pub. Date: May 9, 2019

(65) Prior Publication Data
US 2020/0331060 A1  Oct. 22, 2020

(30) Foreign Application Priority Data
Oct. 31, 2017  (JP) .................................. 2017-211356

(51) Int. Cl.
*B29C 64/153* (2017.01)
*B29C 64/393* (2017.01)
(Continued)

(52) U.S. Cl.
CPC ............ *B29C 64/153* (2017.08); *B22F 10/28* (2021.01); *B22F 10/362* (2021.01); *B22F 10/37* (2021.01);
(Continued)

(58) Field of Classification Search
CPC ........ B22F 10/20; B22F 10/30; B22F 12/224; B22F 10/362; B22F 12/03; B22F 12/41;
(Continued)

(56) References Cited

U.S. PATENT DOCUMENTS

2010/0007062 A1  1/2010  Larsson et al.
2012/0211926 A1  8/2012  Larsson et al.
(Continued)

FOREIGN PATENT DOCUMENTS

CN  101479064 A  7/2009
CN  104159724 A  11/2014
(Continued)

*Primary Examiner* — S. Behrooz Ghorishi
(74) *Attorney, Agent, or Firm* — Volpe Koenig (57) ABSTRACT

An additive manufacturing device performs preliminary heating of a powder material laid and leveled in an irradiation region of an electron beam by irradiating the powder material with the electron beam and manufacturing an additively manufactured article thereafter by irradiating the powder material with the electron beam and melting the powder material. The additive manufacturing device includes a beam emitting unit emitting the electron beam and irradiating the powder material with the electron beam. When the preliminary heating is performed, the beam emitting unit performs irradiation with the electron beam along an irradiation path in a first direction and performs irradiation with the electron beam thereafter along an irradiation path in a second direction set at a jump distance from the irradiation path in the first direction as a direction opposite to the first direction.

5 Claims, 7 Drawing Sheets (51) Int. Cl.

| | | |
|---|---|---|
| *B23K 15/00* | (2006.01) | |
| *B22F 10/28* | (2021.01) | |
| *B22F 10/362* | (2021.01) | |
| *B22F 10/37* | (2021.01) | |
| *B33Y 10/00* | (2015.01) | |
| *B33Y 30/00* | (2015.01) | |
| *B33Y 50/02* | (2015.01) | |
| *B33Y 40/10* | (2020.01) | |
| *B22F 12/00* | (2021.01) | |
| *B22F 12/30* | (2021.01) | |
| *B22F 12/41* | (2021.01) | |
| *B22F 12/44* | (2021.01) | |
| *B22F 12/49* | (2021.01) | |
| *B22F 12/55* | (2021.01) | |
| *B22F 12/67* | (2021.01) | |

(52) U.S. Cl.
 CPC ........ B23K 15/0086 (2013.01); B29C 64/393 (2017.08); *B22F 12/224* (2021.01); *B22F 12/30* (2021.01); *B22F 12/41* (2021.01); *B22F 12/44* (2021.01); *B22F 12/49* (2021.01); *B22F 12/55* (2021.01); *B22F 12/67* (2021.01); *B33Y 10/00* (2014.12); *B33Y 30/00* (2014.12); *B33Y 40/10* (2020.01); *B33Y 50/02* (2014.12)

(58) Field of Classification Search
 CPC .......... B22F 12/44; B22F 12/49; B22F 12/55; B22F 12/67; B22F 10/28; B22F 10/37; B22F 2999/00; B22F 3/1017; B23K 15/0086; B29C 64/153; B29C 64/393; B29C 64/268; B33Y 10/00; B33Y 30/00; B33Y 40/10; B33Y 50/02; Y02P 10/25
 See application file for complete search history.

(56) References Cited

U.S. PATENT DOCUMENTS

| | | |
|---|---|---|
| 2013/0300035 A1 | 11/2013 | Snis |
| 2014/0263209 A1 | 9/2014 | Burris et al. |
| 2014/0265046 A1 | 9/2014 | Burris et al. |
| 2014/0265047 A1 | 9/2014 | Burris et al. |
| 2014/0265048 A1 | 9/2014 | Burris et al. |
| 2014/0265049 A1 | 9/2014 | Burris et al. |
| 2014/0271328 A1 | 9/2014 | Burris et al. |
| 2015/0017055 A1 | 1/2015 | Abe et al. |
| 2015/0086409 A1 | 3/2015 | Hellestam |
| 2015/0283762 A1 | 10/2015 | Maeda et al. |
| 2017/0001243 A1 | 1/2017 | Hayano |
| 2018/0065179 A1 | 3/2018 | Goto |
| 2018/0257140 A1 | 9/2018 | Schymura et al. |
| 2018/0345374 A1 * | 12/2018 | Snis ........................ B33Y 30/00 |

FOREIGN PATENT DOCUMENTS

| | | | | |
|---|---|---|---|---|
| CN | 104972119 A | 10/2015 | | |
| CN | 105188993 A | 12/2015 | | |
| CN | 108568971 A | 9/2018 | | |
| CN | 110709196 A | 1/2020 | | |
| EP | 0609772 A1 | 8/1994 | | |
| EP | 2926981 A1 | 10/2015 | | |
| EP | 3223299 A1 | 9/2017 | | |
| JP | 05-008307 A | 1/1993 | | |
| JP | 06-226861 A | 8/1994 | | |
| JP | 2009-544501 A | 12/2009 | | |
| JP | 5108884 B2 | 12/2012 | | |
| JP | 2014-508668 A | 4/2014 | | |
| JP | 5712306 B2 | 5/2015 | | |
| JP | 2015-199197 A | 11/2015 | | |
| JP | 2017-013426 A | 1/2017 | | |
| JP | 2017-500233 A | 1/2017 | | |
| JP | 2018-149595 A | 9/2018 | | |
| WO | 2008/013483 A1 | 1/2008 | | |
| WO | 2012/102655 A1 | 8/2012 | | |
| WO | WO-2012102655 A1 * | 8/2012 | ............ | B22F 3/1055 |
| WO | 2017/126073 A1 | 7/2017 | | |
| WO | 2018/219689 A1 | 12/2018 | | |

* cited by examiner

(Prior Art)

ADDITIVE MANUFACTURING DEVICE AND ADDITIVE MANUFACTURING METHOD

TECHNICAL FIELD

The present disclosure relates to an additive manufacturing device and an additive manufacturing method for manufacturing an additively manufactured article.

BACKGROUND ART

Japanese Patent No. 5108884 discloses an additive manufacturing device and an additive manufacturing method. As described in Japanese Patent No. 5108884, the additive manufacturing device performs preliminary heating by irradiating a powder material with an electron beam. After the preliminary heating, the powder material is melted by further irradiating the powder material with an electron beam. Thereafter, the melted powder material is solidified. An additively manufactured article is manufactured through these steps of processing. In the device and the method described above, when preliminary heating is performed, an irradiation position of an electron beam is moved in a certain direction. Further, after the irradiation position of an electron beam reaches an end portion of an irradiation region, the irradiation position returns to a position in the other end portion. Further, the irradiation position of an electron beam is moved again in a certain direction.

CITATION LIST

Patent Literature

Patent Literature 1: Japanese Patent No. 5108884

SUMMARY OF INVENTION

Technical Problem

Figure 7:
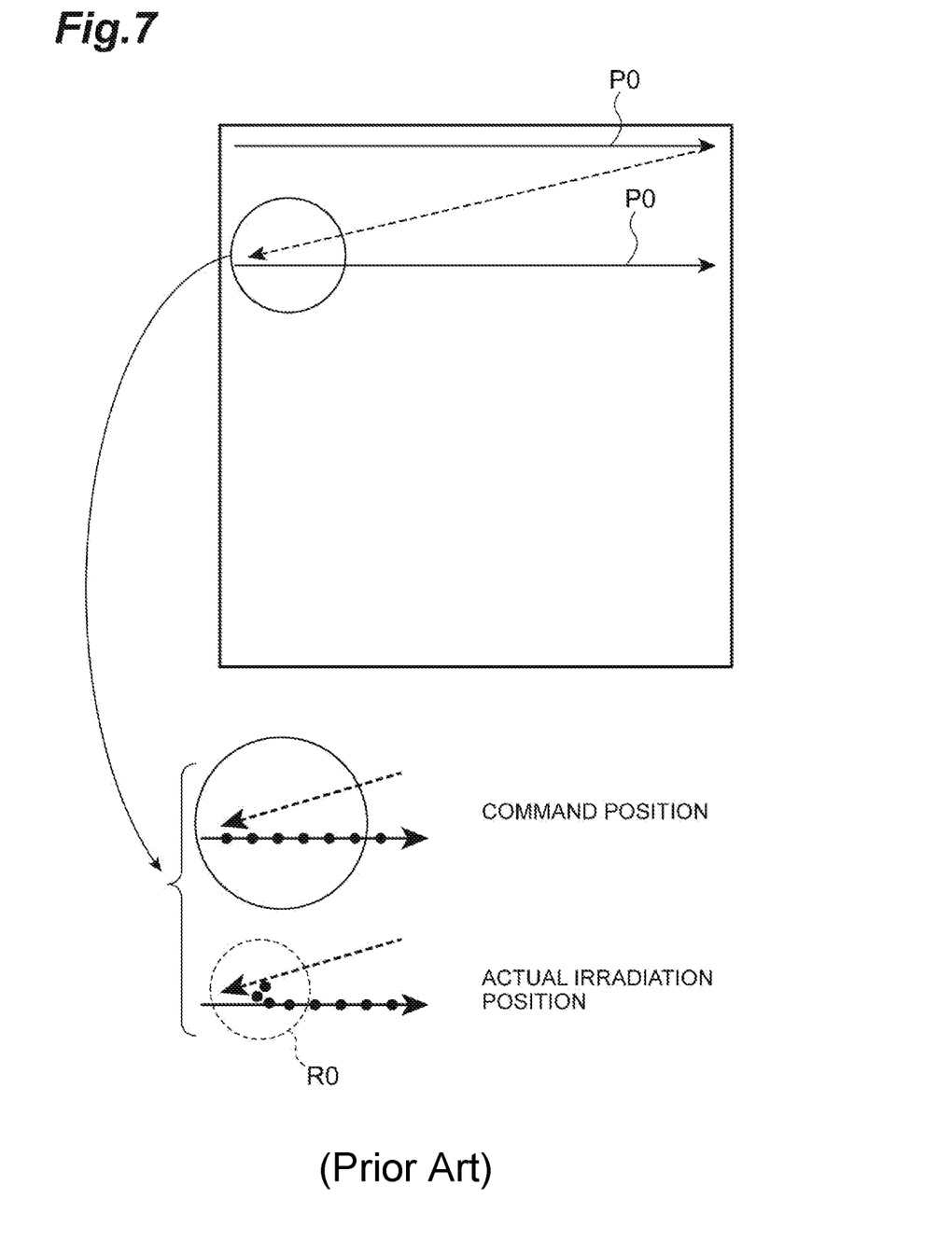
FIG. 7 is a view describing preliminary heating in the background art and a comparative example.

In the device and the method for additive manufacturing described above, there are cases in which preliminary heating cannot be performed appropriately. For example, as illustrated in FIG. 7, when an irradiation position P0 of an electron beam returns from an end portion to the other end portion after the irradiation position P0 has been moved in a certain direction, a moving direction of the irradiation position of an electron beam changes sharply. As a result, there are cases in which an actual irradiation position of an electron beam deviates with respect to a command position at a turning position of the moving direction of the irradiation position. As a result, an excessively heated region R0 appears, thereby leading to an uneven heat input.

Here, it is desired to develop an additive manufacturing device and an additive manufacturing method capable of appropriately performing preliminary heating by curbing an uneven heat input.

Solution to Problem

According to an aspect of the present disclosure, there is provided an additive manufacturing device performing preliminary heating of a powder material laid and leveled in an irradiation region of a charged particle beam by irradiating the powder material with the charged particle beam and manufacturing an additively manufactured article thereafter by irradiating the powder material with the charged particle beam and melting the powder material. The additive manufacturing device is configured to include a beam emitting unit emitting the charged particle beam and irradiating the powder material with the charged particle beam. When the preliminary heating is performed, the beam emitting unit performs irradiation with the charged particle beam along an irradiation path in a first direction and performs irradiation with the charged particle beam thereafter along an irradiation path in a second direction set at a predetermined distance from the irradiation path in the first direction as a direction opposite to the first direction.

Effects of Invention

According to the additive manufacturing device of the present disclosure, preliminary heating can be performed appropriately by curbing an uneven heat input.

DESCRIPTION OF EMBODIMENT

According to an aspect of the present disclosure, there is provided an additive manufacturing device performing preliminary heating of a powder material laid and leveled in an irradiation region of a charged particle beam by irradiating the powder material with the charged particle beam and manufacturing an additively manufactured article thereafter by irradiating the powder material with the charged particle beam and melting the powder material. The additive manufacturing device is configured to include a beam emitting unit emitting the charged particle beam and irradiating the powder material with the charged particle beam. When the preliminary heating is performed, the beam emitting unit performs irradiation with the charged particle beam along an irradiation path in a first direction and performs irradiation with the charged particle beam thereafter along an irradiation path in a second direction set at a predetermined distance from the irradiation path in the first direction as a direction opposite to the first direction. According to this additive manufacturing device, when preliminary heating of the powder material is performed, irradiation is performed with the charged particle beam along the irradiation path in the first direction. Thereafter, irradiation is performed with the charged particle beam along the irradiation path in the second direction set at the predetermined distance therefrom as a direction opposite to the first direction. As a result, when an irradiation position of the charged particle beam is switched from the irradiation path in the first direction to the irradiation path in the second direction, a sharp change in irradiation course of the charged particle beam is curbed.

Therefore, a target irradiation position can be accurately irradiated with the charged particle beam. As a result, occurrence of an uneven heat input in the irradiation region can be curbed.

In the additive manufacturing device according to the aspect of the present disclosure, the predetermined distance may be a distance therefrom across at least one irradiation path. In this case, in the preliminary heating of the powder material, irradiation is performed first with the charged particle beam along the irradiation path in the first direction. Thereafter, irradiation is performed with the charged particle beam along the irradiation path in the second direction set at a distance therefrom across at least one irradiation path as a direction opposite to the first direction. As a result, when the irradiation position of the charged particle beam is switched from the irradiation path in the first direction to the irradiation path in the second direction, a sharp change in irradiation course of the charged particle beam is curbed. Therefore, a target irradiation position can be accurately irradiated with the charged particle beam. As a result, occurrence of an uneven heat input in the irradiation region can be curbed.

In the additive manufacturing device according to the aspect of the present disclosure, the beam emitting unit may perform irradiation with the charged particle beam along a first irradiation path in one direction, may perform irradiation with the charged particle beam thereafter along a second irradiation path in the second direction, and may further perform irradiation with the charged particle beam along a third irradiation path in the first direction or the second direction. A distance from the first irradiation path to the second irradiation path may be longer than a distance from the first irradiation path to the third irradiation path.

The additive manufacturing device according to the aspect of the present disclosure may further include a control unit outputting a control signal to the beam emitting unit. When the preliminary heating is performed, the control unit may cause the beam emitting unit to perform irradiation with the charged particle beam along the irradiation path in the first direction and may output the control signal to the beam emitting unit thereafter such that irradiation is performed with the charged particle beam along the irradiation path in the second direction set at the predetermined distance from the irradiation path in the first direction as a direction opposite to the first direction.

According to another aspect of the present disclosure, there is provided an additive manufacturing method for performing a preliminary heating step of irradiating a powder material laid and leveled in an irradiation region of a charged particle beam with the charged particle beam and performing an article manufacturing step of irradiating the powder material with the charged particle beam and melting the powder material after this preliminary heating step. In the preliminary heating step, after irradiation is performed with the charged particle beam along an irradiation path in a first direction, irradiation is performed with the charged particle beam along an irradiation path in a second direction set at a predetermined distance from the irradiation path in the first direction as a direction opposite to the first direction. According to this additive manufacturing method, in the preliminary heating step, irradiation is performed with the charged particle beam along the irradiation path in the first direction. Thereafter, irradiation is performed with the charged particle beam along the irradiation path in the second direction set at the predetermined distance therefrom as a direction opposite to the first direction. As a result, when the irradiation position of the charged particle beam is switched from the irradiation path in the first direction to the irradiation path in the second direction, a sharp change in irradiation course of the charged particle beam is curbed. Therefore, a target irradiation position can be accurately irradiated with the charged particle beam. As a result, occurrence of an uneven heat input in the irradiation region can be curbed.

According to another aspect of the present disclosure, there is provided an additive manufacturing method including a preliminary heating step of irradiating a powder material laid and leveled in an irradiation region of a charged particle beam with the charged particle beam, and an article manufacturing step of irradiating the powder material with the charged particle beam and melting the powder material after the preliminary heating step. In the preliminary heating step, after irradiation is performed with the charged particle beam along an irradiation path in a first direction, irradiation may be performed with the charged particle beam along an irradiation path in a second direction set at a predetermined distance from the irradiation path in the first direction as a direction opposite to the first direction.

Hereinafter, an additive manufacturing device and an additive manufacturing method according to the present disclosure will be described with reference to the drawings. In description of the drawings, the same reference signs are applied to the same elements, and duplicate description will be omitted.

Figure 1:
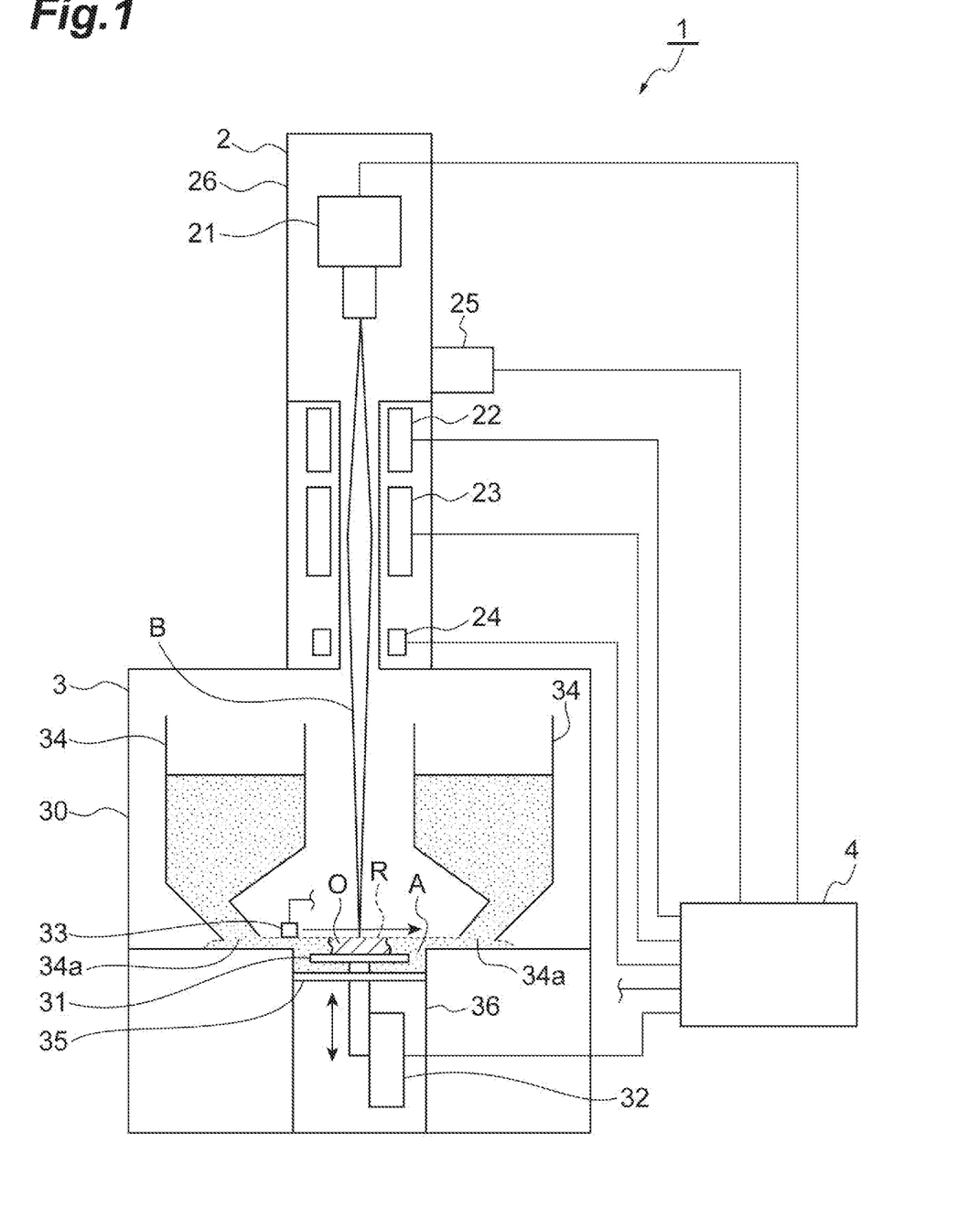
FIG. 1 is a view illustrating a schematic configuration of an additive manufacturing device according to an embodiment of the present disclosure.

FIG. 1 is a view illustrating a schematic configuration of an additive manufacturing device according to an embodiment of the present disclosure. An additive manufacturing device 1 irradiates a powder material A with an electron beam B. Due to irradiation with this electron beam B, the powder material A is melted and is solidified thereafter, and therefore an additively manufactured article O is manufactured. The additive manufacturing device 1 repeats a step of performing preliminary heating of the powder material A by irradiating the powder material A with the electron beam B and a step of manufacturing a part of the article O by irradiating the powder material A with the electron beam B and melting the powder material A. As these steps are repeated, the solidified powder material A is laminated and the article O is manufactured. Preliminary heating is also referred to as preheating. Preliminary heating indicates processing of heating the powder material A before the article O is manufactured. According to preliminary heating, the powder material A is heated at a temperature lower than a melting point of the powder material A. Since the powder material A is heated through preliminary heating, temporary sintering occurs. As a result, accumulation of negative electric charges in the powder material A due to irradiation with the electron beam B is curbed. Therefore, it is possible to curb a smoke phenomenon in which scattering of the powder material A occurs and the powder material A is blown upward at the time of irradiation with the electron beam B.

The additive manufacturing device 1 includes a beam emitting unit 2, a manufacturing unit 3, and a control unit 4. The beam emitting unit 2 emits the electron beam B to the powder material A of the manufacturing unit 3. According to irradiation with this electron beam B, the powder material A is melted. For example, the electron beam B is a charged particle beam. The charged particle beam is formed through linear motion of electrons (charged particles). The beam emitting unit 2 performs preliminary heating of the powder material A by irradiating the powder material A with the electron beam B. The beam emitting unit 2 melts the powder material A by irradiating the powder material A with the electron beam B after preliminary heating. As a result, the additively manufactured article O is manufactured.

The beam emitting unit 2 includes an electron gun portion 21, an aberration coil 22, a focus coil 23, a deflection coil 24, and a scattering detector 25. The electron gun portion 21 is electrically connected to the control unit 4. The electron gun portion 21 operates based on a control signal from the control unit 4. The electron gun portion 21 emits the electron beam B. For example, the electron gun portion 21 emits the electron beam B downward. The aberration coil 22 is electrically connected to the control unit 4. The aberration coil 22 operates based on a control signal from the control unit 4. The aberration coil 22 is installed around the electron beam B emitted from the electron gun portion 21. The aberration coil 22 corrects aberration of the electron beam B. The focus coil 23 is electrically connected to the control unit 4. The focus coil 23 operates based on a control signal from the control unit 4. The focus coil 23 is installed around the electron beam B emitted from the electron gun portion 21. The focus coil 23 causes the electron beam B to converge by performing adjustment such that there is a focused state at an irradiation position of the electron beam B. The deflection coil 24 is electrically connected to the control unit 4. The deflection coil 24 operates based on a control signal from the control unit 4. The deflection coil 24 is installed around the electron beam B emitted from the electron gun portion 21. The deflection coil 24 adjusts a position to be irradiated with the electron beam B based on a control signal. The deflection coil 24 performs electromagnetic beam deflection. Therefore, at the time of irradiation with the electron beam B, a scanning speed of the deflection coil 24 is faster than a scanning speed of mechanical beam deflection. For example, the electron gun portion 21, the aberration coil 22, the focus coil 23, and the deflection coil 24 are installed inside a column 26 exhibiting a tubular shape. In the beam emitting unit 2, installation of the aberration coil 22 may be omitted.

The scattering detector 25 detects occurrence of scattering of the powder material A caused by irradiation of the powder material A with the electron beam B. A phenomenon in which the powder material A is blown upward in a mist state due to scattering of the powder material A is referred to as a smoke phenomenon. That is, the scattering detector 25 detects occurrence of a smoke phenomenon during irradiation of the powder material A with the electron beam B. For example, an X-ray detector is used as the scattering detector 25. The scattering detector 25 (X-ray detector) detects X-rays generated when smoke rises. The scattering detector 25 detects that scattering of the powder material A has occurred based on detection of the X-rays. For example, the scattering detector 25 is attached to the column 26. The scattering detector 25 attached to the column 26 is disposed toward the electron beam B. The scattering detector 25 may be provided in the vicinity of an irradiation region of the powder material A.

The manufacturing unit 3 is a part manufacturing a desired article O. The manufacturing unit 3 accommodates the powder material A inside a chamber 30. The manufacturing unit 3 is provided below the beam emitting unit 2. The manufacturing unit 3 includes the chamber 30 having a box shape. The manufacturing unit 3 includes a plate 31, an elevator 32, a powder supply mechanism 33, and a hopper 34. These elements are disposed inside the chamber 30. The chamber 30 is joined to the column 26. An internal space of the chamber 30 communicates with an internal space of the column 26 in which the electron gun portion 21 is disposed.

The plate 31 supports the article O being manufactured. The article O is manufactured progressively on the plate 31. Further, the plate 31 supports the article O being manufactured progressively. For example, the shape of the plate 31 is a circular shape. The plate 31 is disposed on an extended line in an emission direction of the electron beam B. For example, the plate 31 is provided in a horizontal direction. The plate 31 is disposed such that it is supported by an elevating stage 35 installed therebelow. The plate 31 moves in an up-down direction together with the elevating stage 35. The elevator 32 elevates the elevating stage 35 and the plate 31. The elevator 32 is electrically connected to the control unit 4. The elevator 32 operates based on a control signal from the control unit 4. For example, the elevator 32 moves the plate 31 upward together with the elevating stage 35 in an initial stage of manufacturing of the article O. Further, the elevator 32 moves the plate 31 downward every time the powder material A is laminated while melting and solidifying of the powder material A are repeated on the plate 31. The elevator 32 need only be a mechanism capable of elevating the plate 31, and any mechanism may be used.

The plate 31 is disposed inside a manufacturing tank 36. The manufacturing tank 36 is installed in a lower portion inside the chamber 30. For example, the shape of the manufacturing tank 36 is a cylindrical shape. The manufacturing tank 36 extends in a moving direction of the plate 31. The cross-sectional shape of the manufacturing tank 36 is a circular shape concentrically circular with the plate 31. The shape of the elevating stage 35 follows an inner shape of the manufacturing tank 36. That is, when the inner shape of the manufacturing tank 36 in a horizontal cross-section is a circular shape, the shape of the elevating stage 35 is also a circular shape. According to this shape, leakage of the powder material A, which is supplied to the manufacturing tank 36, downward from the elevating stage 35 is easily curbed. In addition, in order to curb leakage of the powder material A downward from the elevating stage 35, a seal material may be provided in an outer edge portion of the elevating stage 35. The shape of the manufacturing tank 36 is not limited to a cylindrical shape. For example, the manufacturing tank 36 may have a square tube shape with a rectangular cross section.

The powder supply mechanism 33 supplies the powder material A to a part on the plate 31. Moreover, the powder supply mechanism 33 levels the surface of the powder material A. The powder supply mechanism 33 functions as a recoater. For example, a member having a rod shape or a plate shape is used as the powder supply mechanism 33. These members move in the horizontal direction. As a result, the powder material A is supplied to the irradiation region of the electron beam B, and the surface of the powder material A is leveled. Movement of the powder supply mechanism 33 is controlled by an actuator and a mechanism (not illustrated). A mechanism other than the powder supply mechanism 33 may be used as a mechanism for leveling the powder material A. The hopper 34 accommodates the powder material A. A discharging port 34a for discharging the powder material A is formed in a lower portion of the hopper 34. The powder material A discharged from the discharging port 34a flows in to a part on the plate 31. Alternatively, the powder material A is supplied to a part on the plate 31 by the powder supply mechanism 33. The plate 31, the elevator 32, the powder supply mechanism 33, and the hopper 34 are installed inside the chamber 30. The inside of the chamber 30 is in a vacuum state or a substantially vacuum state. Mechanisms other than the powder supply mechanism 33 and the hopper 34 may be used as mechanisms for supplying the powder material A to a part on the plate 31 in a layered shape.

The powder material A is constituted of a number of powder bodies. For example, a metal powder is used as the powder material A. In addition, the powder material A need only be able to be melted and solidified through irradiation with the electron beam B, and grains having a larger grain size than a powder may be used.

The control unit 4 (electronic control unit) controls the additive manufacturing device 1 in its entirety. For example, the control unit 4 includes a computer including a CPU, a ROM, and a RAM. The control unit 4 performs elevating control of the plate 31, operation control of the powder supply mechanism 33, emission control of the electron beam B, operation control of the deflection coil 24, detection of scattering of the powder material A, and detection of a position where scattering of the powder material A has occurred. Regarding elevating control of the plate 31, the control unit 4 outputs a control signal to the elevator 32 such that the elevator 32 operates. As a result, a vertical position of the plate 31 is adjusted. Regarding operation control of the powder supply mechanism 33, the control unit 4 causes the powder supply mechanism 33 to operate before the electron beam B is emitted. As a result, the powder material A is supplied to a part on the plate 31. Moreover, the powder material A is leveled. Regarding emission control of the electron beam B, the control unit 4 outputs a control signal to the electron gun portion 21 such that the electron beam B is emitted from the electron gun portion 21.

Regarding operation control of the deflection coil 24, the control unit 4 outputs a control signal to the deflection coil 24. As a result, the irradiation position of the electron beam B is controlled. For example, when preliminary heating of the powder material A is performed, the control unit 4 outputs a control signal to the deflection coil 24 of the beam emitting unit 2 and performs irradiation with the electron beam B such that a part on the plate 31 is scanned with the electron beam B.

Figure 2:
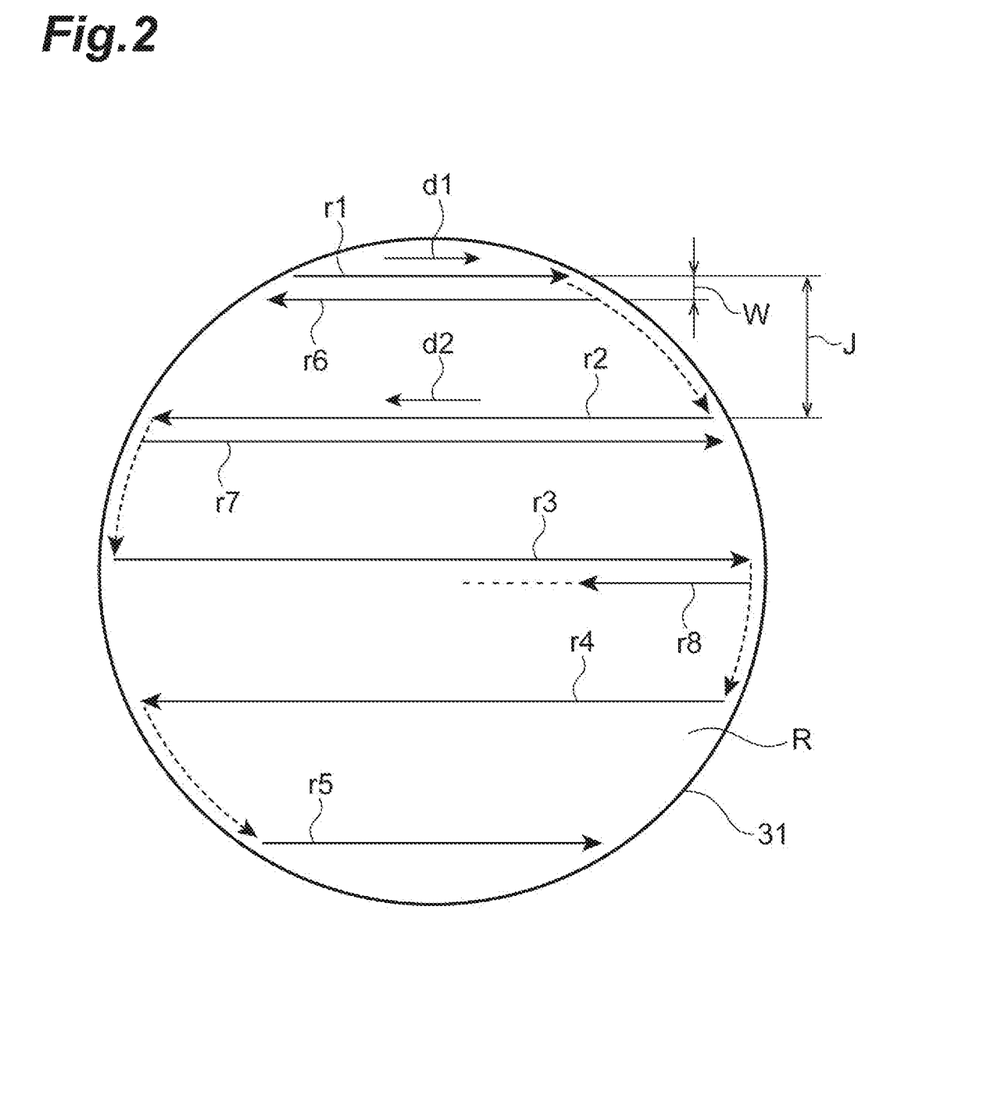
FIG. 2 is a view describing preliminary heating in the additive manufacturing device in FIG. 1.

FIG. 2 is a view of the plate 31 viewed from above. FIG. 2 illustrates an irradiation path of the electron beam B in preliminary heating of the powder material A. In FIG. 2, a region above the plate 31 is an irradiation region R. The irradiation region R is a region in which the article O can be manufactured. In FIG. 2, for the sake of convenience of description, illustration of the powder material A is omitted. Irradiation is performed with the electron beam B such that the electron beam B reciprocates left and right in the irradiation region R. As a result, the entire surface of the irradiation region R is irradiated with the electron beam B. FIG. 2 illustrates only a part of the irradiation path of the electron beam B. Hereinafter, irradiation with the electron beam B will be described specifically.

First, the irradiation position of the electron beam B moves along an irradiation path r1 (first irradiation path) in a first direction d1. Thereafter, the irradiation position of the electron beam B moves along an irradiation path r2 (second irradiation path) set at a jump distance J. The direction of the irradiation path r2 is a second direction d2 that is a direction opposite to the first direction d1. Thereafter, the irradiation position of the electron beam B moves along in the order of an irradiation path r3 in the first direction d1, an irradiation path r4 in the second direction d2, and an irradiation path r5 in the first direction d1. That is, during irradiation with the electron beam B, movement along an irradiation path in the first direction d1 and movement along an irradiation path in the second direction d2 are performed alternately.

After the irradiation position of the electron beam B reaches an end portion of the irradiation region R in the irradiation path r5, the irradiation position of the electron beam B moves to a side of the first irradiation path r1. Specifically, the irradiation position of the electron beam B moves to a place in the vicinity of an end point of the irradiation path r1. Further, the irradiation position of the electron beam B moves along an irradiation path r6 (third irradiation path). The irradiation path r6 is set next to the irradiation path r1. The irradiation path r6 is set such that a path interval W is provided between the irradiation path r6 and the irradiation path r1. The path interval W is a distance to the extent that the powder material A does not scatter due to irradiation with the electron beam B. The path interval W is a distance between an irradiation path and another irradiation path adjacent to each other when the entire surface of the irradiation region R is irradiated with the electron beam B while being scanned with the electron beam B. If the path interval W is excessively narrow, electric charges are likely to be concentrated due to irradiation with the electron beam B. As a result, there is a possibility that scattering of the powder material A occurs. On the other hand, if the path interval W is excessively wide, there is a possibility that the powder material A is heated insufficiently. Therefore, the path interval W is set in consideration of these respects. The jump distance J is set as a distance therefrom across at least one irradiation path. That is, the jump distance J may be longer than the path interval W. The length of the jump distance J may be twice or longer than the length of the path interval W.

Irradiation with the electron beam B for the irradiation path r6 and thereafter is similar to those for the irradiation paths r1 to r5. That is, regarding movement of the irradiation position of the electron beam B, movement along an irradiation path in the first direction d1 and movement along an irradiation path in the second direction d2 are performed alternately. For example, after the irradiation position of the electron beam B moves along the irradiation path r6, it moves along an irradiation path r7 at the jump distance J. Subsequently, the irradiation position of the electron beam B moves along an irradiation path r8. Through such irradiation with the electron beam B, preliminary heating is performed. In this preliminary heating, the entire surface of the irradiation region R is evenly irradiated with the electron beam B.

In this manner, the irradiation position of the electron beam B moves along the irradiation path in the first direction d1. Thereafter, the irradiation position of the electron beam B moves along an irradiation path set at the jump distance J and in the second direction d2. As a result, when the irradiation position of the electron beam B is switched from the irradiation path in the first direction d1 to the irradiation path in the second direction d2, a sharp change in traveling direction of the irradiation position of the electron beam B is curbed. As a result, a target irradiation position can be accurately irradiated with the electron beam B. Therefore, occurrence of an uneven heat input in the irradiation region R can be curbed. Moreover, the irradiation region R can be subjected to preliminary heating evenly.

Figure 3:
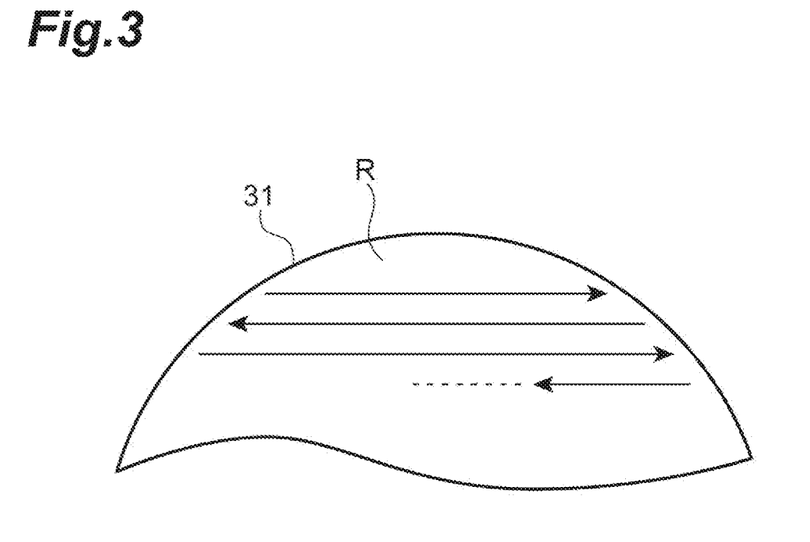
FIG. 3 is a view describing an example of preliminary heating.

For example, as illustrated in FIG. 3, regarding the irradiation position of the electron beam B, movement along a path in the first direction d1 and movement along a path in the second direction d2 are performed alternately. In this case, when the irradiation position shifts from movement along a path in the first direction d1 to movement along a path in the second direction d2, there is no jump distance J therebetween. Even in such paths, as described above, when the irradiation position of the electron beam B is switched from the irradiation path in the first direction d1 to the irradiation path in the second direction d2, a sharp change in traveling direction of the irradiation position of the electron beam B is curbed. As a result, occurrence of an uneven heat input in the irradiation region R can be curbed. Moreover, the irradiation region R can be subjected to preliminary heating evenly.

As illustrated in FIG. 7, in a case in which irradiation is performed with the electron beam B while the irradiation position of the electron beam B is moved in a certain direction, the path changes sharply when irradiation is switched from an irradiation path to a next irradiation path, as described above. As a result, as indicated in a region R0, there is a possibility that deviation of the irradiation position of the electron beam B occurs with respect to a command position. As a result, an uneven heat input is caused.

The additive manufacturing device 1 according to the present disclosure moves the irradiation position of the electron beam B along the irradiation path in the first direction d1. Thereafter, irradiation is performed with the electron beam B along an irradiation path set at the jump distance J and in the second direction d2. As a result, a sharp change in path is curbed. Therefore, deviation of the irradiation position of the electron beam B with respect to a target irradiation position can be curbed. As a result, occurrence of an uneven heat input in the irradiation region R can be curbed. Consequently, the irradiation region R can be subjected to preliminary heating evenly. Moreover, since the irradiation path in the second direction d2 is set at the jump distance J, a space between two continuous irradiation paths is widened with the jump distance J therebetween. Therefore, electric charges are unlikely to concentrate due to irradiation with the electron beam B. Thus, concern for occurrence of scattering of the powder material A can be reduced.

Figure 4:
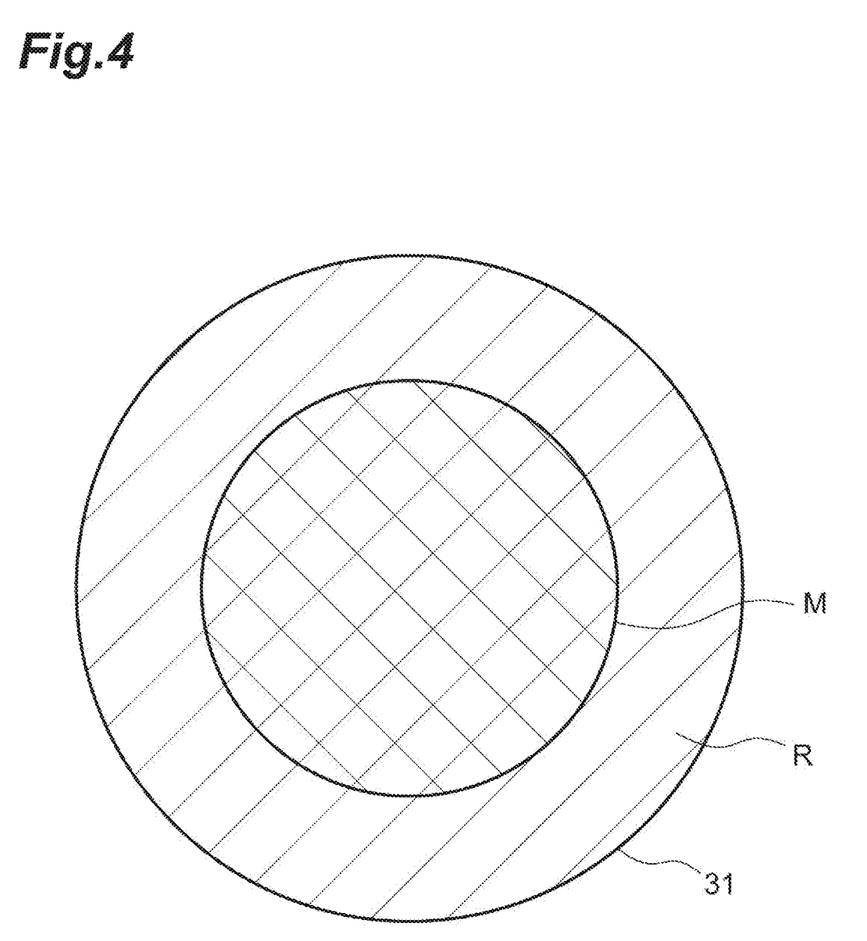
FIG. 4 is another view describing preliminary heating in the additive manufacturing device in FIG. 1.

Irradiation with the electron beam B for preliminary heating may be performed only once with respect to the entire surface of the irradiation region R. In addition, irradiation with the electron beam B for preliminary heating may be repetitively performed a plurality of times with respect to the entire surface of the irradiation region R. Irradiation with the electron beam B for preliminary heating may include irradiation of the irradiation region R and irradiation of a manufacturing region M. The manufacturing region M is a region in which the article O is manufactured. For example, as illustrated in FIG. 4, after the irradiation region R is subjected to preliminary heating, preliminary heating of the manufacturing region M may be performed. In this case, the manufacturing region M can be sufficiently subjected to preliminary heating. As a result, when irradiation with the electron beam B for manufacturing the article O is performed, scattering of the powder material A can be curbed. In addition, compared to a case in which preliminary heating is repetitively performed a plurality of times with respect to the entire surface of the irradiation region R, the number of times of irradiation of the powder material A with the electron beam B is reduced. As a result, an influence of heat on the powder material A can be reduced. That is, excessive heating of the powder material A is avoided, and therefore deterioration, deformation, and the like of the powder material A are curbed. As a result, the powder material A can be reused. In addition, when irradiation with the electron beam B for preliminary heating is performed in a manner divided into irradiation of the irradiation region R and irradiation of the manufacturing region M, after the irradiation position of the electron beam B is moved along the irradiation path in the first direction d1, the irradiation position of the electron beam B is moved along an irradiation path at the jump distance J and in the second direction d2. A region for preliminary heating with respect to the manufacturing region M may be the same region as the manufacturing region M. In addition, a region for preliminary heating with respect to the manufacturing region M may be a region larger than the manufacturing region M.

Figure 5:
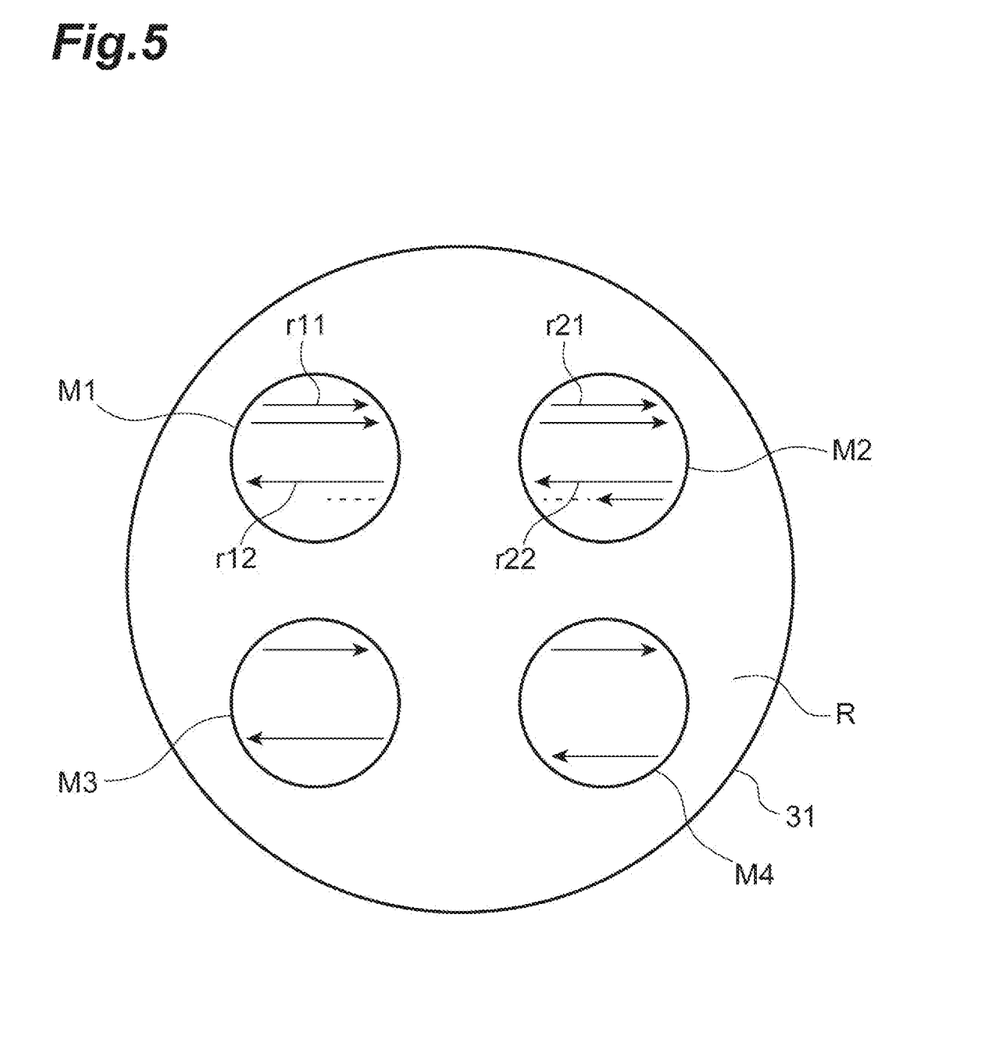
FIG. 5 is another view describing preliminary heating in the additive manufacturing device in FIG. 1.

As illustrated in FIG. 5, one irradiation region R may include a plurality of manufacturing regions M1, M2, M3, and M4. In this case, irradiation of the irradiation region R for preliminary heating may be performed as illustrated in FIG. 2. On the other hand, when preliminary heating of the irradiation region R and preliminary heating of the manufacturing regions M1, M2, M3, and M4 are performed in a divided manner, irradiation of the manufacturing regions M1, M2, M3, and M4 with the electron beam B may be performed sequentially for each of the manufacturing regions M1, M2, M3, and M4.

When the irradiation paths are set on the same straight line in the plurality of manufacturing regions M1, M2, M3, and M4, the irradiation position of the electron beam B may be moved continuously along the irradiation paths. For example, in FIG. 5, an irradiation path r11 in the manufacturing region M1 and an irradiation path r21 in the manufacturing region M2 are set on the same straight line. In this case, after the irradiation position of the electron beam B is moved along the irradiation path r11, the irradiation position of the electron beam B may be moved along the irradiation path r21. In addition, an irradiation path r22 in the manufacturing region M2 and an irradiation path r12 in the manufacturing region M1 are set on the same straight line. In this case, after the irradiation position of the electron beam B is moved along the irradiation path r22, the irradiation position of the electron beam B may be moved along the irradiation path r12. The number of turns of an irradiation course of the electron beam B can be reduced by performing irradiation with the electron beam B in this manner. As a result, irradiation is likely to be performed accurately with the electron beam B along a command position. Therefore, occurrence of an uneven heat input in the manufacturing region M can be curbed. In contrast, if preliminary heating of the manufacturing region M1 and preliminary heating of the manufacturing region M2 are performed individually, the number of turns of the irradiation course increases in preliminary heating of the manufacturing region M1 and the manufacturing region M2. As a result, irradiation is unlikely to be performed accurately with the electron beam B along a command position. Therefore, a possibility of occurrence of an uneven heat input in the manufacturing region M increases.

FIG. 5 illustrates a case in which the irradiation region R includes four manufacturing regions M1, M2, M3, and M4. However, the irradiation region R may include five or more manufacturing regions or fewer than four manufacturing regions. For example, the irradiation region R may include two, three, five, or more manufacturing regions. Even in this case as well, the operational effects described above can be conducted. In the cases as well, a region for preliminary heating in the manufacturing region may be the same region as the manufacturing region. In addition, a region for preliminary heating may be a region larger than the manufacturing region.

In FIG. 1, when the article O is manufactured, the control unit 4 uses three-dimensional computer-aided design (CAD) data of the article O to be manufactured, for example. The three-dimensional CAD data of the article O is manufacture data of the article O which has been input in advance. The control unit 4 generates an aggregate of two-dimensional slice data utilizing the three-dimensional CAD data. For example, an aggregate of two-dimensional slice data is a plurality of pieces of data of horizontal cross-sections corresponding to the vertical position of the article O to be manufactured. Based on this slice data, the control unit 4 decides a region in which the powder material A is irradiated with the electron beam B. The control unit 4 outputs a control signal to the deflection coil 24 in accordance with the region. Further, as illustrated in FIG. 3, the control unit 4 outputs a control signal to the deflection coil 24 of the beam emitting unit 2. As a result, the manufacturing region M is irradiated with the electron beam B in accordance with the article shape.

The control unit 4 detects occurrence of scattering of the powder material A. The control unit 4 functions as a scattering detection unit detecting occurrence of scattering of the powder material A when the powder material A is irradiated with the electron beam B. Scattering of the powder material A means a smoke phenomenon of the powder material A described above. That is, the presence or absence of occurrence of scattering of the powder material A means the presence or absence of occurrence of a smoke phenomenon. The control unit 4 detects the presence or absence of occurrence of scattering of the powder material A based on an output signal of the scattering detector 25. That is, when an output signal of the scattering detector 25 includes a signal component indicating occurrence of scattering, the control unit 4 recognizes that scattering of the powder material A has occurred. Moreover, the control unit 4 stores information indicating occurrence of scattering.

Next, operation of the additive manufacturing device 1 and the additive manufacturing method according to the present disclosure will be described.

Figure 6:
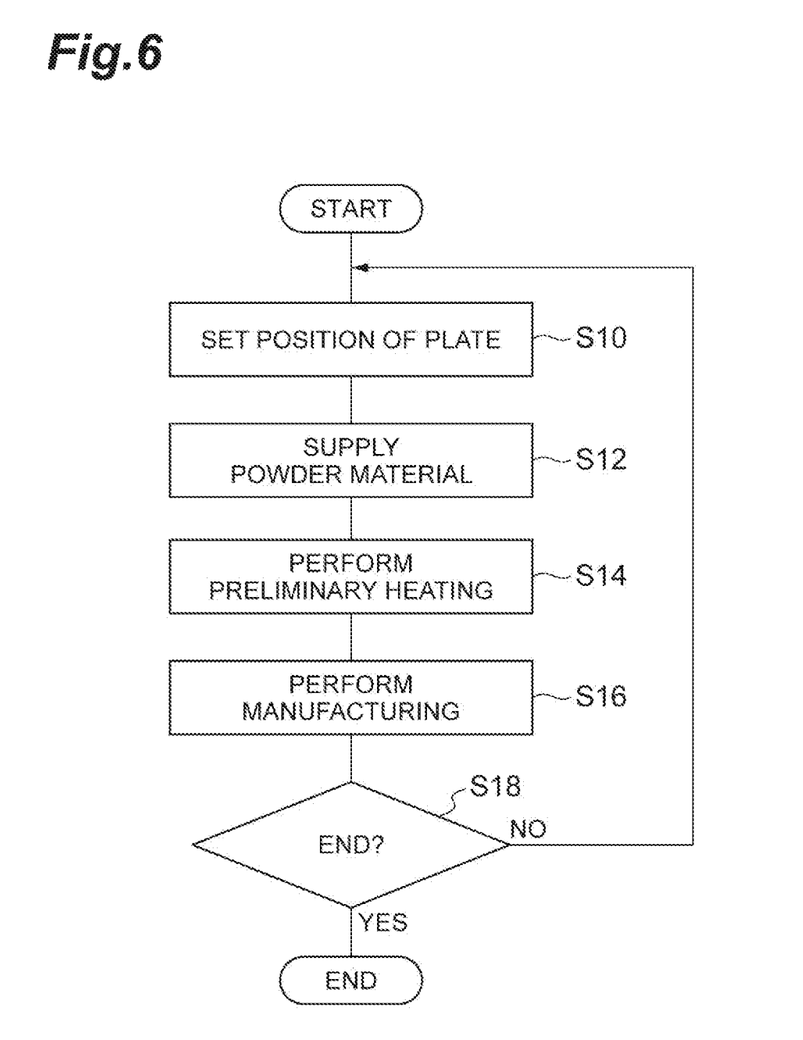
FIG. 6 is a flowchart showing operation of the additive manufacturing device and an additive manufacturing method according to the embodiment.

FIG. 6 is a flowchart showing operation of the additive manufacturing device 1 and the additive manufacturing method according to the present disclosure. For example, a series of control processing in FIG. 6 is performed by the control unit 4.

As shown in Step S10 of FIG. 6, a position of the plate 31 is set. In the following description, Step S10 will be simply indicated as "S10". In addition, the same applies to each of the steps after Step S10. In the initial stage of manufacturing of the article O, the plate 31 is positioned above. Further, when manufacturing of the article O proceeds, the position of the plate 31 moves downward gradually. In FIG. 1, the control unit 4 outputs a control signal to the elevator 32 so that the elevator 32 operates. According to operation of the elevator 32, the elevating stage 35 and the plate 31 are elevated. As a result, the position of the plate 31 is set.

The processing shifts to S12 in FIG. 6. In S12, the powder material A is supplied. In the processing of supplying the powder material A, the powder material A is supplied to the irradiation region R of the electron beam B. S12 may include processing of leveling the surface of the powder material A in addition to supplying of the powder material A. For example, in FIG. 1, the control unit 4 outputs a control signal to an actuator (not illustrated) so that the powder supply mechanism 33 operates. Operation of the powder supply mechanism 33 may include movement of the powder supply mechanism 33 in the horizontal direction, supplying of the powder material A to a part on the plate 31, and processing of leveling the powder material A.

The processing shifts to S14 in FIG. 6. In S14, processing of preliminary heating is performed. In the processing of preliminary heating, the powder material A is heated in advance before the article O is manufactured. The control unit 4 outputs a control signal to the beam emitting unit 2 so that emission of the electron beam B from the electron gun portion 21 and control of the irradiation position of the electron beam B by the deflection coil 24 are performed. As a result, as illustrated in FIG. 2, the powder material A on the plate 31 is irradiated with the electron beam B, and therefore the powder material A is heated.

First, the irradiation position of the electron beam B moves along the irradiation path r1 in the first direction d1. Thereafter, the irradiation position of the electron beam B moves along the irradiation path r2 set at the jump distance J. The direction of the irradiation path r2 is the second direction d2 that is a direction opposite to the first direction d1. Thereafter, the irradiation position of the electron beam B moves along in the order of the irradiation path r3 in the first direction d1, the irradiation path r4 in the second direction d2, and the irradiation path r5 in the first direction d1. That is, during irradiation with the electron beam B, movement along an irradiation path in the first direction d1 and movement along an irradiation path in the second direction d2 are performed alternately.

After the irradiation position of the electron beam B reaches the end portion of the irradiation region R in the irradiation path r5, the irradiation position of the electron beam B moves to a side of the first irradiation path r1. Specifically, the irradiation position of the electron beam B moves to a place in the vicinity of the end point of the irradiation path r1. Further, the irradiation position of the electron beam B moves along the irradiation path r6. The irradiation path r6 is set next to the irradiation path r1. In this manner, the irradiation position of the electron beam B moves along the irradiation path in the first direction d1. Thereafter, the irradiation position of the electron beam B moves along an irradiation path set at the jump distance J and in the second direction d2. As a result, a target irradiation position can be accurately irradiated with the electron beam B. Therefore, occurrence of an uneven heat input in the irradiation region R can be curbed. Moreover, the irradiation region R can be subjected to preliminary heating evenly. Irradiation with the electron beam B for preliminary heating may be performed only once with respect to the entire surface of the irradiation region R. In addition, irradiation with the electron beam B for preliminary heating may be repetitively performed a plurality of times with respect to the entire surface of the irradiation region R.

In addition, as described above, as illustrated in FIG. 4, irradiation with the electron beam B for preliminary heating may be performed in a manner divided into irradiation of the irradiation region R with the electron beam B and irradiation of the manufacturing region M with the electron beam B. In addition, as illustrated in FIG. 5, in a case in which one irradiation region R includes a plurality of manufacturing regions M, and when each of the plurality of manufacturing regions M includes an irradiation path set on the same straight line, the irradiation position of the electron beam B may be moved such that the irradiation paths are continued.

Further, the processing shifts to S16 in FIG. 6. In S16, manufacturing processing is performed. In the manufacturing processing, the article O is manufactured. For example, the control unit 4 generates an aggregate of two-dimensional slice data by utilizing the three-dimensional CAD data of the article O to be manufactured. Further, based on this slice data, the control unit 4 decides the manufacturing region M in which the powder material A is irradiated with the electron beam B. The control unit 4 causes the beam emitting unit 2 to perform irradiation with the electron beam B in accordance with the manufacturing region M. In the manufacturing processing of S16, layers of a portion constituting the article O are manufactured.

The processing shifts to S18. In S18, it is determined whether or not conditions for ending the control processing are established. A case in which conditions for ending the control processing are established denotes a case in which manufacturing of a desired additively manufactured article O has ended, for example. That is, the foregoing case is a case in which manufacturing of the article O has been completed as a result of the control processing of S10 to S16 performed repetitively. On the other hand, a case in which the conditions for ending the control processing are not established denotes a case in which manufacturing of a desired additively manufactured article O has not been completed, for example.

When it is determined in S18 that the conditions for ending the control processing are not established, the processing shifts to S10. On the other hand, when it is determined in S18 that the conditions for ending the control processing are established, a series of control processing in FIG. 6 ends.

As the processing of S10 to S18 shown in FIG. 6 is performed repetitively, the article O is formed gradually in a layer shape. Then, a desired article O is manufactured finally.

As described above, according to the additive manufacturing device 1 and the additive manufacturing method of the present disclosure, when preliminary heating of the powder material A is performed, after the irradiation position of the electron beam B is moved along the irradiation path in the first direction d1, the irradiation position of the electron beam B is moved along an irradiation path at the jump distance J and in the second direction d2. Accordingly, when the irradiation position of the electron beam B is switched from the irradiation path in the first direction d1 to the irradiation path in the second direction d2, a sharp change in irradiation course of the electron beam B is curbed. Therefore, a target irradiation position can be accurately irradiated with the electron beam B. As a result, occurrence of an uneven heat input in the irradiation region R can be curbed.

In the additive manufacturing device 1 and the additive manufacturing method according to the present disclosure, the jump distance J may be a distance therefrom across at least one irradiation path. In this case, the irradiation position of the electron beam B moves along an irradiation path set at a distance therefrom across at least one irradiation path from the irradiation path in the first direction d1 and in the second direction d2. As a result, when the irradiation position of the electron beam B is switched from the irradiation path in the first direction to the irradiation path in the second direction, a sharp change in irradiation course of the electron beam B is curbed. Therefore, a target irradiation position can be accurately irradiated with the charged particle beam. As a result, occurrence of an uneven heat input in the irradiation region can be curbed.

The additive manufacturing device and the additive manufacturing method of the present disclosure are not limited to the embodiment described above. The present disclosure can adopt various deformation forms within a range not departing from the gist disclosed in the claims.

For example, in the embodiment described above, a circular shape is illustrated as an example of the shape of the plate 31. The shape of the plate 31 may be a shape other than a circular shape. Specifically, a rectangular shape may be employed as the shape of the plate 31. In addition, in the embodiment described above, a circular shape is illustrated as an example of the shape of the irradiation region R of the electron beam B. The shape of the irradiation region R is not limited to a circular shape. For example, the shape of the irradiation region R may be a rectangular shape. In addition, the shape of the manufacturing region M is not also limited to a circular shape. The shape of the manufacturing region M may be suitably set in accordance with the shape of the article O. For example, the shape of the manufacturing region M may be a rectangular shape.

In the embodiment described above, the electron beam B is illustrated as an example of a charged particle beam, and a case in which the article O is manufactured by irradiating the powder material A with the electron beam B is illustrated as an example. The charged particle beam is not limited to the electron beam B, and an energy beam other than the electron beam B may be employed. For example, an ion beam may be employed as a charged particle beam. Further, the article O may be manufactured by irradiating the powder material A with an ion beam.

In the foregoing description of the additive manufacturing device and the additive manufacturing method of the present disclosure, irradiation is performed along the irradiation path r6 (third irradiation path) after irradiation is performed along the irradiation path r5. The irradiation path r5 is a last path in a path group (nth irradiation path group) including the first irradiation paths r1 to r5. In addition, the irradiation path r6 is a first path in a path group (n+1th irradiation path group) including the second irradiation paths r6 to r10. In the foregoing description and FIG. 2, the direction of this irradiation path r6 is opposite to the direction of the irradiation path r1 (first irradiation path). The irradiation path r1 is a first path in the path group (nth irradiation path group) including the first irradiation paths r1 to r5.

However, there is no need for the direction of the irradiation path r6 to be set opposite to the direction of the nearby irradiation path r1. For example, the direction of the irradiation path r6 may be the same as the direction of the irradiation path r1. In addition, the direction of the irradiation path r6 may be set opposite to the direction of the irradiation path r5 or may be the same direction. This is because a certain period of time has elapsed after irradiation performed along the irradiation path r1 until irradiation performed along the irradiation path r6 and therefore an influence of irradiation is small. That is, when any path (for example, the irradiation path r1) in an nth irradiation path group and any path (for example, the irradiation path r6) in an n+1th irradiation path group are close to each other (W is small), the directions of the paths may be opposite to each other. In addition, the directions of the paths may be the same as each other.

In addition, in the foregoing description, the irradiation path r1 is illustrated as an example of the first irradiation path, the irradiation path r2 is illustrated as an example of the second irradiation path, and the irradiation path r6 is illustrated as an example of the third irradiation path. However, the first irradiation path, the second irradiation path, and the third irradiation path are not limited to the foregoing examples. For example, the irradiation path r2 may serve as the first irradiation path, the irradiation path r3 may serve as the second irradiation path, and the irradiation path r7 may serve as the third irradiation path. That is, the second irradiation path is a path used for irradiation performed subsequently to irradiation to the first irradiation path. In addition, the third irradiation path is a path which is used for irradiation performed after irradiation is performed to at least one or more paths from irradiation to the second irradiation path and is adjacent to the first irradiation path.

That is, the third irradiation path is not a path used for irradiation performed subsequently to irradiation to the second irradiation path.

REFERENCE SIGNS LIST

1 Additive manufacturing device
2 Beam emitting unit
3 Manufacturing unit
4 Control unit
21 Electron gun portion
22 Aberration coil
23 Focus coil
24 Deflection coil
25 Scattering detector
31 Plate
32 Elevator
33 Powder supply mechanism
34 Hopper
A Powder material
B Electron beam
d1 First direction
d2 Second direction
J Jump distance (predetermined distance)
R Irradiation region
M Manufacturing region
O Article

The invention claimed is:

1. An additive manufacturing device performing preliminary heating of a powder material laid and leveled in an irradiation region of a charged particle beam by irradiating the powder material with the charged particle beam and manufacturing an additively manufactured article thereafter by irradiating the powder material with the charged particle beam and melting the powder material, the additive manufacturing device comprising:
   a beam emitting unit emitting the charged particle beam and irradiating the powder material with the charged particle beam,
   the beam emitting unit configured such that when the preliminary heating is performed, the beam emitting unit performs irradiation with the charged particle beam along a first irradiation path in a first direction and performs irradiation with the charged particle beam thereafter along a second irradiation path in a second direction set at a predetermined distance from the first irradiation path in the first direction as a direction opposite to the first direction,
   wherein the beam emitting unit is further configured such that irradiating with the charged particle beam for preliminary heating includes irradiation of an irradiation region and irradiation of a smaller manufacturing region within the irradiation region, the manufacturing region is a region in which the article is manufactured, preliminary heating of the irradiation region and preliminary heating of the manufacturing region are performed sequentially such that the preliminary heating of the manufacturing region is performed by irradiation along paths that do not extend outside the manufacturing region.

2. The additive manufacturing device according to claim 1,
   wherein the beam emitting unit is further configured such that the predetermined distance is a distance therefrom across at least one irradiation path.

3. The additive manufacturing device according to claim 1,
   wherein the beam emitting unit is further configured such that the beam emitting unit performs irradiation with the charged particle beam along the first irradiation path in the first direction, performs irradiation with the charged particle beam along a third irradiation path in the first direction or the second direction, and
   wherein the beam emitting unit is further configured such that a distance from the first irradiation path to the second irradiation path is longer than a distance from the first irradiation path to the third irradiation path.

4. The additive manufacturing device according to claim 1 further comprising:
   a control unit outputting a control signal to the beam emitting unit,
   wherein the control unit is configured such that when the preliminary heating is performed, the control unit causes the beam emitting unit to perform irradiation with the charged particle beam along the first irradiation path in the first direction and outputs the control signal to the beam emitting unit thereafter such that irradiation is performed with the charged particle beam along the second irradiation path in the second direction set at the predetermined distance from the first irradiation path in the first direction as a direction opposite to the first direction.

5. The additive manufacturing device according to claim 1,
   wherein preliminary heating of the manufacturing region is performed after the irradiation region is subjected to preliminary heating.

* * * * *